United States Patent
Yoon et al.

(10) Patent No.: US 8,402,513 B2
(45) Date of Patent: Mar. 19, 2013

(54) NETWORK ACCESS METHOD OF WIRELESS LOCAL AREA NETWORK (WLAN) TERMINALS AND NETWORK SYSTEM THEREOF

(75) Inventors: Hyun-Min Yoon, Suwon-si (KR);
Soung-Kwan Kim, Suwon-si (KR);
Myeon-Kee Youn, Incheon-si (KR);
Seong-Joon Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1818 days.

(21) Appl. No.: 11/305,138

(22) Filed: Dec. 19, 2005

(65) Prior Publication Data
US 2006/0174330 A1 Aug. 3, 2006

(30) Foreign Application Priority Data
Feb. 1, 2005 (KR) .................. 10-2005-0009288

(51) Int. Cl.
*H04L 9/32* (2006.01)
*G06K 9/00* (2006.01)

(52) U.S. Cl. ............. 726/4; 380/270; 370/338; 455/410

(58) Field of Classification Search .......... None
See application file for complete search history.

(56) References Cited

U.S. PATENT DOCUMENTS

| | | | |
|---|---|---|---|
| 6,965,674 B2* | 11/2005 | Whelan et al. | 380/270 |
| 7,587,201 B2* | 9/2009 | Ohara | 455/423 |
| 2001/0048744 A1* | 12/2001 | Kimura | 380/247 |
| 2003/0219129 A1* | 11/2003 | Whelan et al. | 380/270 |
| 2004/0168081 A1* | 8/2004 | Ladas et al. | 713/201 |
| 2006/0045272 A1* | 3/2006 | Ohaka | 380/270 |
| 2007/0115900 A1* | 5/2007 | Liang et al. | 370/338 |
| 2009/0208013 A1* | 8/2009 | Watanabe et al. | 380/272 |

OTHER PUBLICATIONS

Jason et al, An IEEE 802.11 Wireless LAN Security,Oct. 22, 2001, pp. 1-17.*

* cited by examiner

*Primary Examiner* — Fikremariam A Yalew
(74) *Attorney, Agent, or Firm* — H.C. Park & Associates, PLC

(57) ABSTRACT

A network access method of Wireless Local Area Network (WLAN) terminals and a network system thereof which are designed to support network association between a terminal and an Access Point (AP) in an IEEE 802.11 WLAN environment includes: scanning at least one AP in the network and determining whether or not the AP uses a Wired Equivalent Privacy (WEP) Key; and converting to an Open System authentication mode or a Shared Key authentication mode according to the determination. Accordingly, the terminal can scan for the existence of a WEP Key from at least one AP and convert into a network-accessible Open System authentication mode and a Shared Key authentication mode so as to execute an association.

20 Claims, 2 Drawing Sheets

NETWORK ACCESS METHOD OF WIRELESS LOCAL AREA NETWORK (WLAN) TERMINALS AND NETWORK SYSTEM THEREOF

CLAIM OF PRIORITY

This application makes reference to, incorporates the same herein, and claims all benefits accruing under 35 U.S.C. §119 from an application for *NETWORK ACCESS METHOD OF WLAN TERMINALS AND NETWORK SYSTEM THEREOF* earlier filed in the Korean Intellectual Property Office on Feb. 01, 2005 and there duly assigned Serial No. 2005-9288.

BACKGROUND OF THE INVENTION

1. Field of the Invention

The present invention relates to a network access method of Local Area Network (LAN) terminals and a network system thereof, more particularly, present invention relates to a network access method of LAN terminals and a network system thereof designed to support network association between a terminal and an Access Point (AP) in an IEEE 802.11 Wireless Local Area Network (WLAN) environment.

2. Description of the Related Art

Various authentications such as Medium Access Control (MAC) based authentication and IEEE 802.11 standard based authentication are being used as major Wireless Local Area Network (WLAN) authentication methods.

That is, according to the IEEE 802.11 standard, there are two major authentication methods, namely, the Open System authentication method and the Shared Key authentication method.

The Open System authentication method accepts all wireless terminals according to an extended meaning of authentication. This authentication method directly allows access to any wireless terminal attempting access with an Service Set Identifier (SSID) of an Access Point (AP). Access is carried out by an authentication exchange, which constitutes two frames. A first frame of a mobile terminal is an authentication subtype and a management frame. Although IEEE 802.11 does not officially call this frame an authentication request, this frame is actually used for this purpose. Upon receiving an authentication request frame, an AP processes the authentication request and replies with a response frame.

The Shared Key authentication method uses a Wired Equivalent Privacy (WEP) Key, and thus is used only by APs or terminals having WEP Key capability. IEEE 802.11 requires Shared Key authentication to all terminals having WEP Key capability. Shared Key realization requires equal distribution of WEP Keys to terminals and APs before authentication. Shared Key authentication procedures need four authentication subtype management frames, in which the first frame has an information element for identifying an authentication algorithm and sequence number like a frame in an Open System authentication. The second frame of the Shared Key authentication procedures acts to challenge. The third frame acts to respond to a challenge from a mobile terminal. The mobile terminal constitutes a frame with three information elements such as an authentication algorithm identifier, a sequence number and a challenge syntax. The challenge syntax is encoded according to the WEP set in the terminal. Upon receiving the third frame, an AP decodes the third frame to execute a WEP integration test, and if integration is confirmed, replies with a successful state code. Successful challenge syntax decoding proves that WEP Key set in the mobile terminal is identical with that set in the AP, and means that access is allowed.

An IEEE 802.11 standard mobile terminal as described above is set with both Open System and Shared Key authentications, which are optional with a user. That is, if an AP uses Open System authentication, the user sets the terminal with Open System authentication, and if the AP uses Shared Key authentication, the user sets the terminal with Shared Key authentication. In this way, access procedures may be executed so that the user can normally use a network.

Since some of recently commercialized APs can respond to an authentication mode requested by terminals through automatic detection, it is possible to utilize these APs. A terminal can attempt authentication according to Shared Key authentication to detect the current authentication-setting state of a corresponding AP. However, an AP capable of automatically detecting and accepting user's authentication mode will be an optimum solution for the purpose of maximizing user's convenience. If a terminal retrieves APs in an early stage, it is possible to detect any APs using the WEP mode. When attempting to access the APs where such a WEP has been set, the authentication mode of the terminal is forcibly changed into the Shared Key authentication mode so that an access request is sent to a corresponding AP. Then, the AP can accept the Shared Key authentication mode access request.

In general, even though a WEP is set to an AP, if the AP is adapted to use the Open System authentication, a terminal is unconditionally authenticated by the IEEE 802.11 standard and thus allowed to access the AP even though the WEP Key value of the terminal is not identical with that set in the AP. However, although access is allowed, the user cannot actually use the network since user packets encoded according to a different WEP Key are not properly decoded in the AP. For these reasons, network access via the WEP Key of the AP is not allowed in fact, and audio data for voice communication is not transmitted or received. Thus, a user cannot trust any authentication state displayed on the terminal. The user may continuously attempt access based upon the authentication state even though network access is not allowed in fact. There are problems in that this increases the confusion of the user and thus maximizes inconvenience.

SUMMARY OF THE INVENTION

The present invention has been devised to solve the foregoing problems of the prior art and it is therefore an object of the present invention to provide a network access method of Wireless Local Area Network (WLAN) terminals and a network system thereof which allow a terminal to scan for the existence of a Wired Equivalent Privacy (WEP) Key from at least one Access Point (AP) and to convert into a network-accessible Open System authentication mode and a Shared Key authentication mode so as to execute an association.

According to one aspect of the invention for realizing the above objects, a network access method of WLAN terminals is provided, the method comprising: scanning at least one AP in the network and determining whether or not the AP uses a WEP Key; and converting to an Open System authentication mode or a Shared Key authentication mode according to the determination.

The network access method preferably further comprises: providing an input window for the input of a WEP Key after converting into a corresponding authentication mode; and attempting an association with the inputted WEP Key.

The network access method preferably further comprises attempting the association by repeatedly inputting the WEP Key until the association succeeds if the association has previously failed.

A determination as to whether or not the WEP Key has been used preferably comprises analyzing information in a probe response message from the AP.

According to another aspect of the invention for realizing the above objects, a network access method of Wireless Local Area Network (WLAN) terminals is provided, the method comprising: determining whether or not a Wired Equivalent Privacy (WEP) Key exists in at least one Access Point (AP); providing an input window for the input of the WEP Key upon a determination that the WEP Key has been set in the AP; and converting to a Shared Key authentication mode after providing an input window for the input of the WEP Key.

The network access method preferably further comprises attempting association with an inputted WEP Key.

The network access method preferably further comprises attempting the association by repeatedly inputting the WEP Key until the association has succeeded if the association has previously failed.

A determination as to whether or not the WEP Key has been used preferably comprises analyzing information in a probe response message from the AP.

According to yet another aspect of the invention for realizing the above objects, a network access method of Wireless Local Area Network (WLAN) terminals is provided, the method comprising: determining whether or not a Wired Equivalent Privacy (WEP) Key exists from at least one Access Point (AP); and converting to an Open System authentication mode upon a determination that the WEP Key has not been set in the AP.

The network access method preferably further comprises attempting association to the AP.

The network access method preferably further comprises attempting the association by repeatedly inputting the WEP Key until the association has succeeded if the association has previously failed.

A determination as to whether or not the WEP Key has been used preferably comprises analyzing information in a probe response message from the AP.

According to sill another aspect of the invention for realizing the above objects, a network system for association of Wireless Local Area Network (WLAN) terminals is provided, the network system comprising: at least one Access Point (AP) adapted to relay both wired and wireless networks; and at least one terminal adapted to determine whether or not a Wired Equivalent Privacy (WEP) Key exists in the AP, and to convert into an Open System authentication mode or a Shared Key authentication mode according to the determination.

The terminal is preferably further adapted to provide an input window for the input of the WEP Key if the terminal has converted into the Shared Key authentication mode.

The terminal is preferably further adapted to attempt association to the AP with an inputted WEP Key and repeatedly inputting the WEP Key until the association has succeeded.

The terminal is preferably further adapted to determine whether or not the WEP Key has been used by analyzing information in a probe response message from the AP.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Authentication for the access of a Wireless Local Area Network (WLAN) terminal (hereinafter referred to as a 'terminal') associated with a WLAN to a network can be implemented according to upper layer access such as Medium Access Control (MAC) hierarchical access presented in the IEEE 802.11 standard. Herein, the network is an external wired network established between Access Points (APs), and it is necessary to occupy the network to link with a counterpart AP or terminal in order to enable voice, visual and data communication.

MAC hierarchical access supports both the Open System and Shared Key modes. The Open System authentication mode forwards a request from a terminal to link with the counterpart AP or terminal, whereas Shared Key authentication mode allows communication only after a code of a Wired Equivalent Privacy (WEP) Key has been authenticated.

Figure 1:
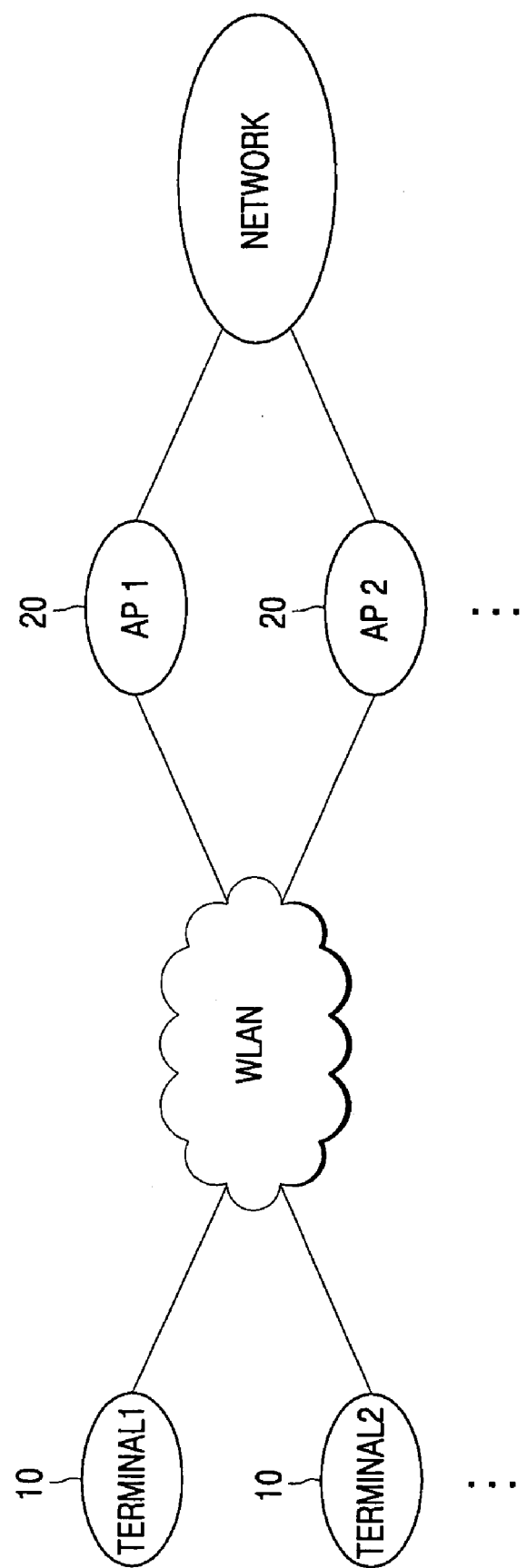
FIG. 1 is a conceptual view of a network system of WLAN terminals according to an embodiment of the present invention.

FIG. 1 is a conceptual view of a network system of WLAN terminals according to an embodiment of the present invention.

As shown in FIG. 1, the network system for authentication according to an embodiment of the present invention includes at least one Access Point (AP) 20, which is set up according to one of an Open System authentication and a Shared Key authentication to relay between wireless and wired LANs (hereinafter referred to as 'networks'), and at least one terminal 10 for implementing WLAN-based network association via the AP 20 to execute voice, visual and data communication. The AP 20 is provided with network components (not shown) to be used for Dynamic Host Configuration Protocol (DHCP) after the network association.

The terminal 10 executes network access according to a MAC hierarchical access as follows:

The AP must have functions for automatically detecting any authentication mode requested by terminals in the network system, and the terminal can access the network to execute communication only if it is set up to select an Open System or Shared Key authentication mode according to whether or not the AP uses a WEP Key. That is, according to this invention, if the AP which is to execute an association is using a WEP Key, the terminal itself first sets up a WEP Key on a user screen for the purpose of normal network access. Then, the authentication mode is automatically converted into a Shared Key authentication mode before an association is attempted. If the WEP Key is wrong, the AP generates an authentication failure and inputting a WEP Key into a user input window is immediately allowed so that a user can set up a suitable WEP Key. This allows rapid and correct association to the user.

Therefore, this invention matches the terminal 10 according to a corresponding access mode by detecting whether or not the AP 20 uses a WEP Key for the purpose of network access so that the terminal 10 can easily and rapidly execute association in the network.

Figure 2:
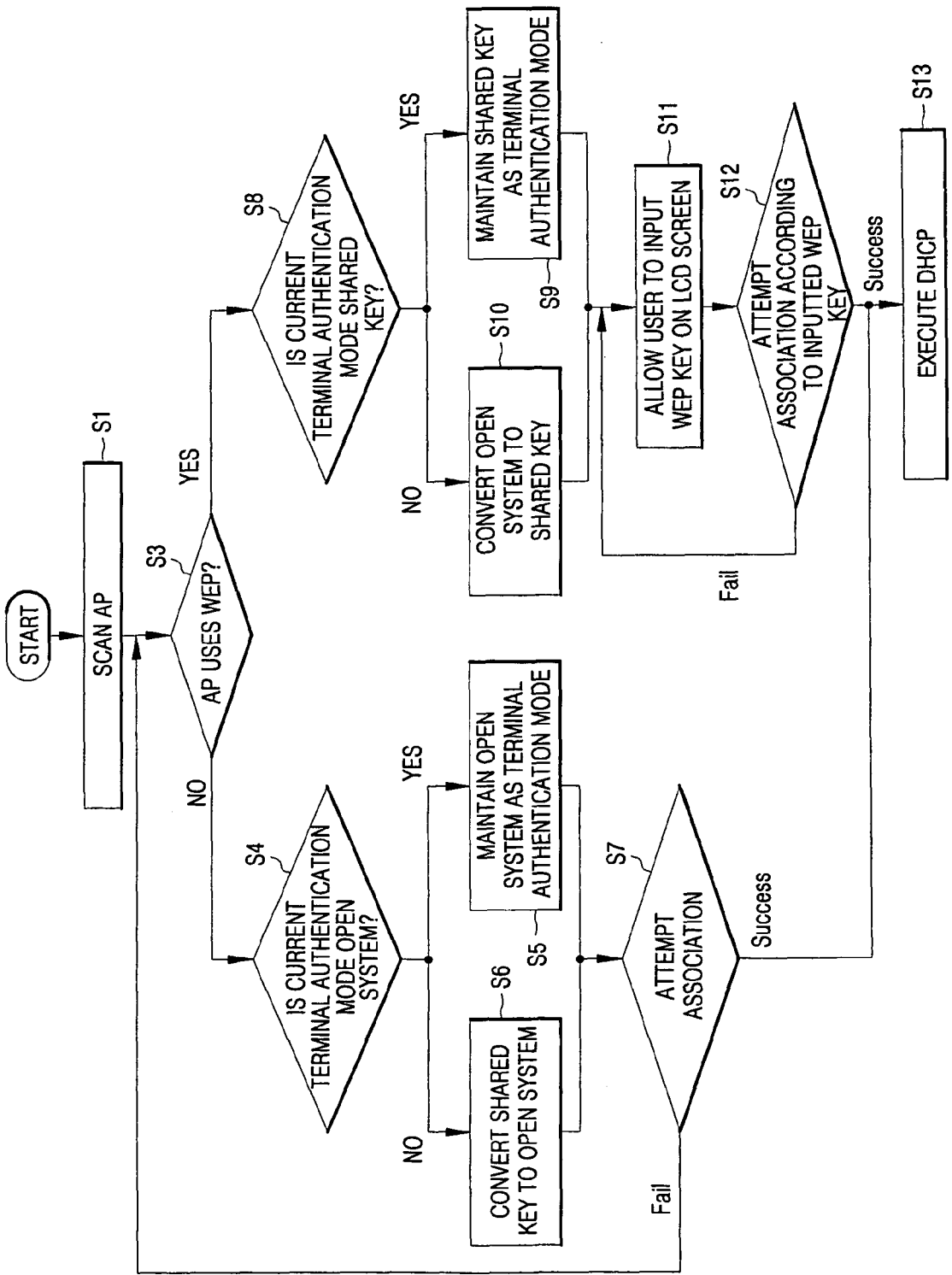
FIG. 2 is a flowchart of a network access method of WLAN terminals according to an embodiment of the present invention.

FIG. 2 is a flowchart of a network access method of WLAN terminals 10 according to an embodiment of the present invention.

First, it will be assumed that the terminal 10 is to execute a typical WLAN communication, and has WLAN system components allowing network access to the AP 20 in which a system for this purpose has bee established. It will also be assumed that a communication system for network access has been established and thus various system environments are built up to enable voice and data communication with another terminal 10.

As shown in FIG. 2, the terminal 10 broadcasts a probe request message toward at least one of a number of APs 20 of different SSID in order to access the network. A WLAN environment is established among the terminals 10 and the APs 20. Upon receiving the probe request message, an AP 20 located near to the terminal 10 replies with a probe response message corresponding to the probe request message to the terminal 10. Then, the terminal 10 receives and scans the probe response message received from the AP 20 and thus prepares for network access toward the AP 20 in S1. The terminal 10 analyzes the received probe response message to determine whether or not the AP 20 uses a WEP Key in S3. In addition, the terminal 10 can detect any SSID of the AP 20.

The terminal 10 acknowledges its authentication mode by recognizing that the WEP Key has not been set in the AP 20. That is, the terminal 10 determines whether its authentication mode is an Open System authentication mode or a Shared Key authentication mode by analyzing the authentication mode of its internal system in S4.

If the authentication mode is an Open System authentication mode, the terminal 10 maintains the currently set Open System authentication mode and sets this as its authentication mode in S5. As the authentication mode of the terminal 10 is set to the Open System authentication mode, the terminal 10 attempts association to an AP 20 of the above SSID in which the same authentication mode has been set, by which a network can be occupied.

That is, the terminal 10 transmits an association request message to the AP 20 to attempt association by which a network can be occupied, and when receiving the association request message, the AP 20 replies with an association response message to the terminal 10. Then, network association procedures are completed. If the terminal 10 does not receive the association response message from the AP 20, the terminal 10 assumes that the network association has failed, and then repeatedly attempts network association to the AP 20 in S7.

That is, if the network association has failed in S7, the network association procedures are randomly repeated to attempt network association to the AP 20 until a network is successfully associated. If network association is successfully accomplished, DHCP procedures are executed by which a network is occupied for a predetermined time period for the purpose of executing voice, visual and data communication in S13.

If the terminal 10 recognizes that a WEP Key has not been set in the AP 20 of the corresponding SSID in S3, the terminal 10 confirms its authentication mode in S4. That is, unlike in S5, if the authentication mode of the terminal 10 itself is set to the Shared Key authentication mode instead of the Open System authentication mode, the terminal 10 converts its Shared Key authentication mode to the Open System authentication mode and resets the Open System as its authentication mode in S6. As the authentication mode is reset as the Open System authentication mode, the terminal 10 attempts association to the AP 20 of the corresponding SSID set to the same authentication mode, by which a network can be occupied.

The terminal 10 and the AP 20 communicate an association request message and an association response message to each other according to association procedures so as to attempt association. If the AP 20 is idle and waits for a network association, the terminal 10 can successfully execute an association attempt, thereby occupying a network in S7. However, if the association has failed, a failure in network association to the AP 20 is recognized, and thus procedures for network association to the AP 20 are executed again. The procedures for network association are randomly repeated in order to attempt network association to the AP 20 until a network is successfully associated.

If network association is successfully accomplished in S7, the network is occupied for a predetermined time period and DHCP is performed to execute voice, visual and data communication in S13.

If the terminal 10 recognizes that a WEP Key is set to the AP 20 of the SSID selected in S3, the terminal 10 confirms the authentication mode set to itself. That is, the terminal 10 recognizes whether an Open System authentication mode or a Shared Key authentication mode has been set to the terminal 10 itself by analyzing the internal system of the terminal 10 in S8.

If the Shared Key authentication mode has been set as the authentication mode of the terminal 10, the terminal maintains and sets the currently set Shared Key authentication mode as its authentication mode in S9. When the Shared Key authentication mode has been set, an advice for the WEP Key input according to the above authentication mode is displayed on an LCD window of the terminal 10 for the purpose of network association, and as a WEP Key is inputted according to the above advice, the WEP Key value is set in the internal system of the terminal 10 in S11. If the WEP Key is a code for authentication and data protection, a network can be normally used by a terminal 10 having a correct code only. For example, the terminal 10 can be provided with an IP via DHCP by an ISP provider.

Therefore, as the authentication mode of the terminal 10 is set as a Shared Key authentication mode, with the WEP Key of the Shared Key authentication mode, the terminal 10 attempts association to the AP 20 of the corresponding SSID set to the same authentication mode, by which a network can be occupied.

That is, during authentication, the terminal 10 transmits a challenge Txt message encoded according to the WEP Key to the AP 20, attempting association that enables network occupation. Upon receiving the challenge Txt message, the AP 20 decodes this message and replies with a message informing "success" or "fail." Upon receiving a "fail" as the replay message, the terminal 10 advises again for the input into a WEP Key window of a user screen. Upon receiving a "success" as the reply message, the terminal 10 recognizes successful network association according to remaining association procedures in S12.

However, if the WEP Keys are mismatched, that is, the association of the terminal 10 has failed since the WEP Key of the terminal is not identical with the WEP Key of the AP 20, the terminal 10 attempts association again by repeating the above Shared Key authentication mode procedures in S11 and S12. The Shared Key authentication mode procedures owing to different WEP Keys are repeated until the WEP Keys are matched, and thus network association to the AP 20 is randomly and repeatedly attempted until network association is successfully accomplished.

If network association is successfully accomplished in S12, DHCP procedures are executed by which a network is occupied for a predetermined time period for the purpose of executing voice, visual and data communication in S13.

If the terminal 10 recognizes that a WEP Key has been set in the AP 20 of the selected SSID in S3, the terminal 10 confirms its authentication mode in S8. That is, unlike in S9, if the authentication mode of the terminal 10 itself is set to the Open System authentication mode instead of the Shared Key authentication mode, the terminal converts its Open System authentication mode to the Shared Key authentication mode and resets Share Key authentication as the authentication mode thereof.

If the authentication mode of the terminal is the Open System authentication mode, the AP allows association even though the WEP Key is not identical so that a user may not recognize any problem during network access. Thus, the authentication mode of the terminal is reset in S10. Upon being reset to the Shared Key authentication mode, the terminal 10 executes advising procedures again for the input of the WEP Key according to the authentication mode into an LCD window of the terminal 10 for the purpose of network association, and the WEP Key is inputted according to the above advising procedures to set the WEP Key value in the internal system of the terminal 10 in S11.

Therefore, as the authentication mode of the terminal 10 is set to the Shared Key authentication mode, with the WEP Key of the Shared Key authentication mode, the terminal 10 attempts association to the AP 20 of the corresponding SSID set to the same authentication mode, by which a network can be occupied.

That is, the terminal 10 transmits a challenge Txt message encoded according to the WEP Key to the AP 20, attempting association that enables network occupation. Upon receiving the challenge Txt message, the AP 20 decodes this message and replies with a message informing "success" or "fail." Upon receiving a "fail" as the replay message, the terminal 10 advises again for the input into a WEP Key window of a user screen. Upon receiving a "success" as the reply message, the terminal 10 recognizes successful network association according to remaining association procedures in S12.

However, if the WEP Keys are mismatched, that is, the association of the terminal 10 has failed since the WEP Key of the terminal is not identical with the WEP Key of the AP 20, the terminal 10 attempts association again by repeating the above Shared Key authentication mode procedures in S11 and S12. The Shared Key authentication mode procedures owing to different WEP Keys are repeated until the WEP Keys are matched, and thus network association to the AP 20 is randomly and repeatedly attempted until network association is successfully accomplished.

If network association is successfully accomplished in S12, the network is occupied for a predetermined time period and DHCP is performed to execute voice, visual and data communication in S13.

As described hereinbefore, the network access or association method and the network system thereof allow a terminal itself to scan the authentication mode of an AP and to attempt association in the same authentication mode so as to overcome problems of the prior art. It will be apparent to those skilled in the art that modifications and variations can be made without departing from the spirit and scope of the invention as defined by the appended claims.

Since the present invention allows a terminal to scan for the existence of a WEP Key from at least one AP and to convert into a network-accessible Open System authentication mode and a Shared Key authentication mode so as to execute association, this has an effect of maximizing user's convenience.

In addition, since association is performed substantially perfect, ISP providers can enhance call connection rates to thereby improve productivity.

What is claimed is:

1. A network access method of Wireless Local Area Network (WLAN) terminals, the method comprising:
   broadcasting, by a WLAN terminal, a probe request toward at least one Access Point (AP) in the network;
   receiving, in response to broadcasting the probe request, at least one probe response comprising information associated with an authentication mode of the AP;
   determining, by the WLAN terminal based on the information, whether the at least one AP uses a first Wired Equivalent Privacy (WEP) Key; and
   converting, automatically by the WLAN terminal in response to determining whether the at least one AP uses the first WEP Key, an authentication mode of the WLAN terminal to one of an Open System authentication mode and a Shared Key authentication mode.

2. The network access method of claim 1, further comprising:
   providing an input window for input of a second WEP Key, in response to converting the authentication mode of the WLAN terminal to the Shared Key authentication mode;
   receiving input of the second WEP Key; and
   attempting, by the WLAN terminal, an association with the at least one AP using the second WEP Key.

3. The network access method of claim 2, further comprising:
   attempting, repeatedly by the WLAN terminal, the association by repeatedly receiving input of at least one other second WEP Key until the association succeeds, in response to at least one determination that the association has previously failed.

4. The network access method of claim 1, further comprising:
   analyzing, in response to determining whether the at least one AP uses the first WEP Key, an authentication mode of the WLAN terminal,
   wherein converting the authentication mode of the WLAN terminal is based on analyzing the authentication mode of the WLAN terminal.

5. A network access method of Wireless Local Area Network (WLAN) terminals, the method comprising:
   determining, by a WLAN terminal, whether at least one Access Point (AP) uses a first Wired Equivalent Privacy (WEP) Key based on authentication mode setting information received from the at least one AP in response to a probe request;
   providing, by the WLAN terminal, an input window configured to enable input of a second WEP Key in response to a determination that the at least one AP uses the first WEP Key; and
   converting, automatically by the WLAN terminal, an authentication mode of the WLAN terminal to a Shared Key authentication mode in response to the determination that the at least one AP uses the first WEP Key.

6. The network access method of claim 5, further comprising:
   attempting, by the WLAN terminal based on the second WEP Key, an association with the at least one AP.

7. The network access method of claim 6, further comprising:
   attempting, repeatedly by the WLAN terminal, the association by repeatedly receiving input of at least one other second WEP Key until the association succeeds, in response to at least one determination that the association has previously failed.

8. The network access method of claim 5, wherein the authentication mode setting information is received from the at least one AP as part of a probe response message.

9. A network access method of Wireless Local Area Network (WLAN) terminals, the method comprising:
   determining, by a WLAN terminal, whether at least one Access Point (AP) uses a first Wired Equivalent Privacy (WEP) Key based on authentication mode setting information received from the at least one AP in response to a probe request; and
   converting, automatically by the WLAN terminal, an authentication mode of the WLAN terminal to an Open System authentication mode, in response to a determination that the at least one AP does not use the first WEP Key.

10. The network access method of claim 9, further comprising:
   attempting, by the WLAN terminal, an association with the at least one AP.

11. The network access method of claim 10, further comprising:
   attempting, repeatedly by the WLAN terminal, the association until the association succeeds, in response to at least one determination that the association has previously failed.

12. The network access method of claim 9, wherein the authentication mode setting information is received from the at least one AP as part of a probe response message.

13. A network system for association of Wireless Local Area Network (WLAN) terminals, the network system comprising:
   at least one Access Point (AP) adapted to relay communications between wired and wireless networks; and
   at least one terminal adapted to:
      broadcast a probe request toward the at least one AP,
      receive, in response to broadcasting the probe request, at least one probe response comprising information associated with an authentication mode of the AP,
      determine, based on the information, whether the at least one AP uses a first Wired Equivalent Privacy (WEP) Key, and
      automatically convert, in response to the determination whether the at least one AP uses the first WEP Key, an authentication mode of the at least one terminal to one of an Open System authentication mode and a Shared Key authentication mode.

14. The network system of claim 13, wherein the terminal is further adapted to present an input window adapted to enable input of a second WEP Key in response to the at least one terminal automatically converting the authentication mode of the terminal to the Shared Key authentication mode.

15. The network system of claim 14, wherein the terminal is further adapted to attempt an association with the at least one AP using an input second WEP Key and further adapted to repeatedly attempt the association by repeatedly using at least one other input second WEP Key until the association succeeds.

16. The network system of claim 13, wherein the terminal is further adapted to analyze, in response to the determination whether the at least one AP uses the first WEP Key, an authentication mode of the at least one terminal, and wherein the automatic conversion of the authentication mode of the at least one terminal is based on analysis of the authentication mode of the at least one terminal.

17. A network address method, the method comprising:
   determining, at a terminal, whether an access point (AP) uses a Wired Equivalent Privacy (WEP) authentication key based on authentication mode setting information received from the AP in response to a probe request,
   wherein, in response to determining that the AP uses the WEP authentication key:
      determining whether the authentication mode of the terminal is a Shared Key authentication mode, and
   wherein, in response to determining that the authentication mode of the terminal is not the Shared Key authentication mode:
      converting, automatically by the terminal, the authentication mode of the terminal to the Shared Key authentication mode.

18. The method of claim 17, wherein, in response to determining that the AP uses the WEP authentication key, the method further comprising:
   receiving a WEP authentication key input at the terminal; and
   transmitting, to the AP, a first association request based on the input WEP authentication key.

19. The method of claim 18, wherein, in response to determining that the AP does not use the WEP authentication key, the method further comprising:
   determining whether the authentication mode of the terminal is an Open System authentication mode, and
   wherein, in response to determining that the authentication mode of the terminal is not the Open System authentication mode, the method further comprising:
      converting, automatically by the terminal, the authentication mode of the terminal to the Open system authentication mode; and
      transmitting, to the AP, a second association request.

20. The method of claim 19, wherein the authentication mode setting information is received from the AP as part of a probe response, and wherein determining whether the AP uses the WEP authentication key comprises using the probe response message, the method further comprising:
   executing at least one of voice communication, visual communication, and data communication, in response to successful association of the terminal with the AP.

* * * * *

UNITED STATES PATENT AND TRADEMARK OFFICE
CERTIFICATE OF CORRECTION

| | | |
|---|---|---|
| PATENT NO. | : 8,402,513 B2 | Page 1 of 1 |
| APPLICATION NO. | : 11/305138 | |
| DATED | : March 19, 2013 | |
| INVENTOR(S) | : Yoon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1938 days.

Signed and Sealed this
Thirtieth Day of December, 2014

Michelle K. Lee
*Deputy Director of the United States Patent and Trademark Office*